United States Patent [19]

Verespej

[11] Patent Number: 4,825,513
[45] Date of Patent: May 2, 1989

[54] MODULAR ADJUSTABLE CLAMP SYSTEM

[75] Inventor: Michael A. Verespej, Trumbull, Conn.

[73] Assignee: Burndy Corporation, Norwalk, Conn.

[21] Appl. No.: 87,610

[22] Filed: Aug. 20, 1987

[51] Int. Cl.[4] .............................................. F16G 11/06
[52] U.S. Cl. .................................. 24/135 N; 24/335; 24/569; 269/43; 269/152; 439/479
[58] Field of Search ............... 24/135 N, 135 R, 329, 24/335, 486, 525, 569; 269/43, 152, 210; 439/477, 479, 480, 801, 811, 812

[56] References Cited

U.S. PATENT DOCUMENTS

| | | | |
|---|---|---|---|
| 288,035 | 11/1883 | Dixon | 269/210 X |
| 554,091 | 2/1896 | Sears | 24/569 X |
| 728,450 | 5/1903 | Everett | 269/43 X |
| 1,352,647 | 9/1920 | Benton | 24/335 X |
| 1,432,336 | 10/1922 | Hurley | 24/335 |
| 2,324,803 | 7/1943 | Snyder | 269/152 X |
| 2,816,586 | 12/1957 | Koberle | 269/152 X |
| 2,999,378 | 9/1961 | Blair | 24/335 X |
| 3,544,956 | 12/1970 | Bricker, Jr. | 24/335 X |
| 4,607,829 | 8/1986 | Suska | 269/152 X |
| 4,674,730 | 6/1987 | Roberts | 269/43 |

FOREIGN PATENT DOCUMENTS

| | | | |
|---|---|---|---|
| 185628 | 5/1956 | Austria | 269/152 |
| 146948 | 9/1936 | Fed. Rep. of Germany | 24/329 |

OTHER PUBLICATIONS

Tips Tool Co., Inc. Catalog #7 Supplement #1, Aug. 1936.

Primary Examiner—Kenneth J. Dorner
Assistant Examiner—Laurie K. Cranmer
Attorney, Agent, or Firm—Perman & Green

[57] ABSTRACT

A modular adjustable clamp is provided for use in a multi-clamp assembly. The clamp comprises a frame, a clamp interconnection for connecting the frame to a second clamp, and a portion for engaging a cable. The modular clamp can be connected to the second clamp in an adjustable manner such that various sizes of cable can be clamped with various distances between the cables. A system may also be provided for stably connecting at least two multi-clamp assemblies for use in attaching a connector to the cables.

14 Claims, 5 Drawing Sheets

U.S. Patent  May 2, 1989  Sheet 1 of 5  4,825,513
FIG. 1
PRIOR ART
FIG. 2A
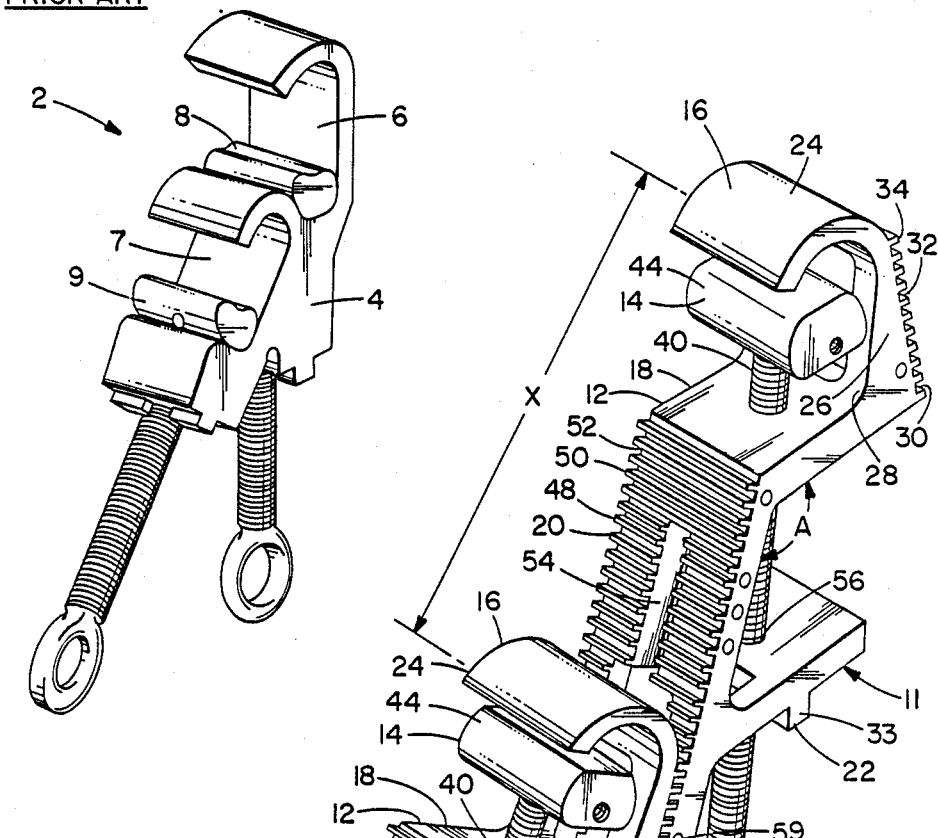
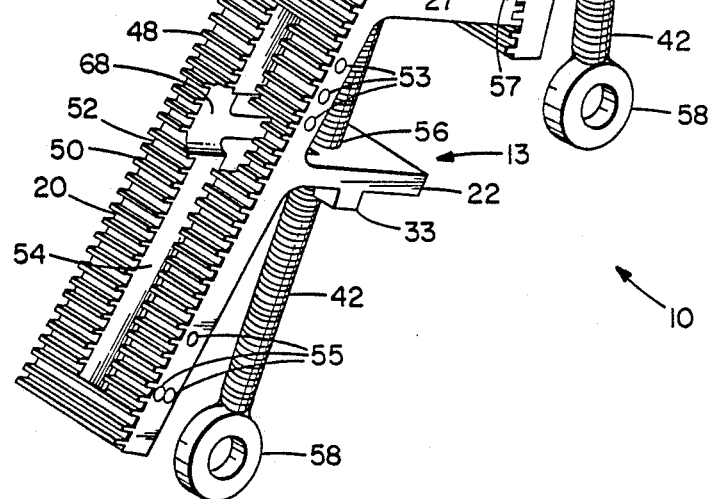

FIG. 5
FIG. 6
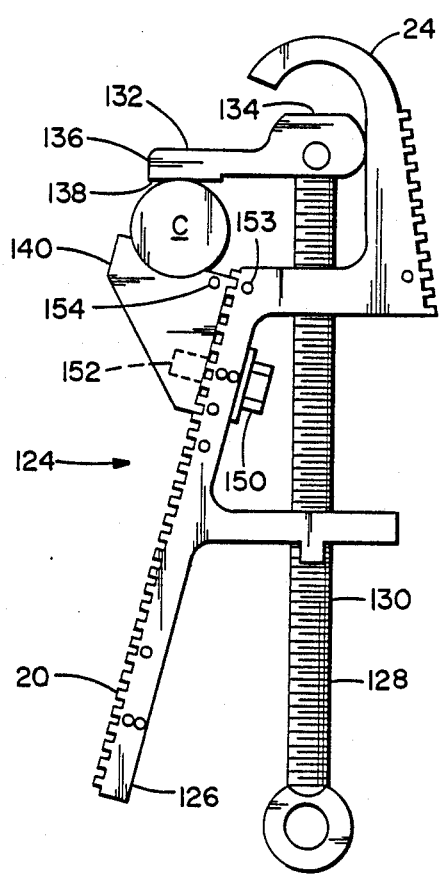
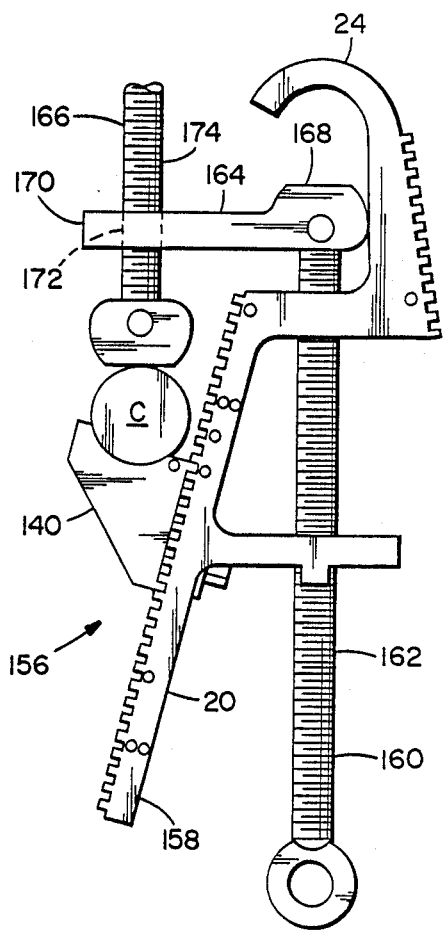

MODULAR ADJUSTABLE CLAMP SYSTEM

BACKGROUND OF THE INVENTION

1. Field of the Invention

The present invention relates to clamps for use in clamping cables and, more specifically, to a modular adjustable clamp for use in making connections to power cables.

2. Prior Art

Multi-clamping clamps are generally known in the art. One such multi-clamping clamp, used in the clamping of cables for making connection to power cables, is called a piggyback clamp. Piggyback clamps are generally used for power cables, such as heavy duty overhead power transmission cables, to hold a tap cable in place at an appropriate distance from a main conductor cable for connecting a connector to the two cables.

Generally, the two cables are connected by the use of a wedge type connector having a "C" shell. The two cables are placed in the connector at opposite ends of the "C" shell and a wedge component is driven between the cables to connect the cables and hold them in place. Generally, an explosively-operated tool is used for this purpose such as the tool disclosed in U.S. Pat. No. 3,296,792 by Hedberg et al.

The wedge type connectors are provided in various sizes to accommodate various sizes of cables. Usually, the connectors are color coded having red, blue and yellow colors as indications of the range of cable sizes the connector can accommodate. Generally, the red connector takes the smallest size cable as small as about 0.1 inch in diameter. The blue connector takes the next range of sizes of cable. The yellow connector takes the largest range of sizes up to about 1½ inches in diameter.

The piggyback clamps of the prior art comprise a unitary frame having two fixed "C" sections. Disposed in the "C" sections ar movable clamping anvils that can be moved to clamp a cable or wire in each "C" section. The clamp "C" sections are arranged such that the two cables being clamped are separated from each other by a fixed distance to aid in the attachment of the connector.

A problem arises in the prior art in that the clamping devices cannot clamp all sizes of cables; therefore, different sizes of clamps must be used for various sizes of cables.

A further problem arises in that damage to a portion of a prior art device cannot be easily fixed and may render the entire device useless.

A further problem arises in that no system is provided for combining two or more devices to provide a more stable and safe work area for installation of the connector.

A further problem arises in that the devices are incapable of being adapted or adjusted to accommodate larger ranges of spacings between "C" sections or larger sizes of cables then presently used.

SUMMARY OF THE INVENTION

The foregoing problems are overcome and other advantages are provided by a modular clamp for use in a multi-clamp assembly.

In accordance with one embodiment of the invention the clamp comprises a frame means, a clamp interconnection means for modularly connecting the frame means to a second clamp and means for engaging a cable.

In accordance with another embodiment of the invention a clamp assembly is provided for use in individually clamping at least two cables. The assembly comprises a first clamp means, a second clamp means and means for adjustably positioning the first clamp means relative to the second clamp means.

In accordance with another embodiment of the invention a system for clamping at least two cables is provided comprising a first clamping assembly means having a first modular clamp means and a second modular clamp means and second clamping assembly means such that the first assembly means can be clamped to a first and second cable at a first position relative to the cables and the second assembly means can be clamped to the first and second cables at a second position relative to the cables. The embodiment may also comprise means for connecting the first clamping assembly means with the second clamping assembly means.

In accordance with one method of the invention a method is provided for individually clamping at least two cables comprising the steps of connecting a first clamp means with a second clamp means, clamping a first cable to the first clamp means and clamping a second cable to the second clamp means.

In accordance with another method of the invention a method is provided for individually clamping at least two cables comprising the steps of adjusting a first clamp means relative to a second clamp means in a first clamp assembly, clamping a first cable to the first clamp means and clamping a second cable to the second clamp means.

BRIEF DESCRIPTION OF THE DRAWINGS

The foregoing aspects and other features of the invention are explained in the following description, taken in connection with the accompanying drawings wherein:

FIG. 1 is a perspective view of a piggyback clamp of the prior art.

FIG. 2a is a perspective view of a modular clamp assembly incorporating features of the invention.

FIG. 5 is a cross-sectional view of an alternate embodiment of the invention.

FIG. 6 is a side view of an alternate embodiment of the invention.

DETAILED DESCRIPTION OF THE INVENTION

Figure 2B:
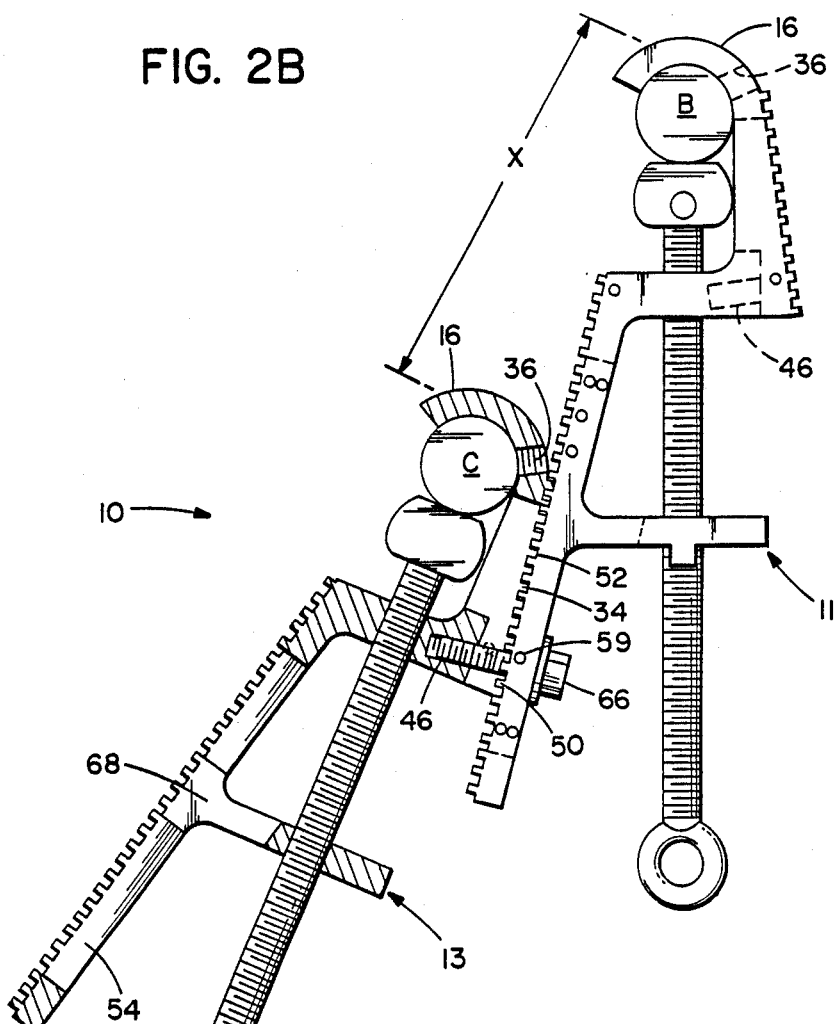
FIG. 2b is a partial cross-sectional view and a partial side view of the assembly shown in FIG. 2a in use in clamping two cables.

Referring to FIG. 1, there is shown a perspective view of a piggyback clamp 2 of the prior art. The clamp 2 has a unitary body 4 having two fixed "C" sections 6 and 7. The device also has two movable anvils 8 and 9 that can cooperate with the body 4 to hold two cables (not shown) in the "C" sections 6 and 7.

Referring now to FIG. 2a, there is shown a perspective view of a modular clamp assembly 10 comprising two modular clamps incorporating features of the invention; a first clamp 11 and a second clamp 13. While the following description is being given with reference to specific embodiments, it should be understood that the present invention can be used in a wide variety of embodiments. In addition, it should be understood that the present invention can be incorporated with any suitable size, shape or material.

In the embodiment shown, the clamps 11 and 13 are relatively identical. For ease of reference, like members will be used to identify like parts. Each clamp comprises a frame 12 and a movable anvil assembly 14. In this embodiment, the frame 12 generally has four main sections; a top section 16, a middle section 18, a bottom section 20 and a stabilizing section 22. The frame 12 is generally made of metal such as aluminum; however, any suitable material can be used. The frame 12 is also generally made as a single unitary member, but can be made of smaller members fixedly assembled to form a unitary frame.

The top section 16 of the frame 12 has an upper curved portion 24 and two side members 26 and 27 connecting the upper curved portion 24 to the middle section 18. Although two side members 26 and 27 are shown in this embodiment, more or less side members can be used to maintain integrity between the top upper curved portion 24 and the middle section 18. In this embodiment, the side members 26 and 27 also have a trapezoidal shape to avoid deflection of the upper curved portion 24 during tightening of the anvil assembly 14 as will be described below and to reduce the weight of the clamps 11. The side members 26 and 27 have first inner faces 28 and second outer faces 30. The inner faces 28 are relatively smooth and allow the anvil assembly 14 to move without substantial obstruction or interference therefrom. The outer faces 30 have a relatively uniform series of teeth or locking members 34 having notches 32 therebetween. A threaded hole 36 (See FIG. 2b) is located on the upper curved portion 24.

Referring now to the middle section 18 of the frame 12, the middle section 18 is relatively solid and joins the top section 16 and the bottom section 20. A central aperture 40 passes through the middle section 18 for passage of a portion of the anvil assembly 14. The central aperture 40, in this embodiment, is threaded to cooperate with a threaded bar 42 of the anvil assembly 14 to move an anvil block 44 relative to the upper curved portion 24. In alternate embodiments, any suitable cooperative means could be provided to move the anvil assembly 14. A second threaded hole 46 (See FIG. 2b) is also provided in the middle section 18 as will be described below.

The bottom section 20, in this embodiment, is integrally formed with the middle section 18. The bottom section 20 is also generally straight and extends away from the middle section 18 at an angle A and forms an extension away from the clamping area of the frame along a substantially linear pathway. Although any suitable angle can be provided for angle A, in a preferred embodiment angle A is about 110 degrees. A front face 48 of the bottom section 20 comprises a series of teeth or locking members 50 having notches 52 therebetween. A longitudinal central aperture 54 is provided along the bottom section along a substantial portion of its length. In the embodiment shown, located on the sides of the bottom section 20 are two series of slight marking indentations 53 and 55 having colored markings therein such as red, blue and yellow. The lower markings 55, in this embodiment, comprise an upper red colored marking 59 and two lower markings blue and yellow 61. Also located on the top section 16 is a similar identation 57 having a black marking for purposes as will be described below.

The stabilizing section 22 extends from the bottom section 20 substantially parallel to the middle section 18. A central aperture 56 is provided in alignment with the central aperture 40 in the middle section 18, but is not threaded and is sufficiently large enough to allow relatively free longitudinal movement of the bar 42 therethrough. However, the stablizing section 22 can prevent the bar 42 from excessive lateral movement. In this embodiment, the stabilizing section 22 also comprises a key 33 which can cooperate with a tool such as a shotgun hotstick (not shown) for use by the operator in positioning the assembly 10.

The movable anvil assembly 14, in this embodiment, generally comprises a threaded bar 42 and an anvil block 44. The bar 42 has a handle portion 58 for allowing an operator to axially turn the bar 42. The anvil block 44 is rotatably mounted to the top of the bar 42 such that the block 44 can remain relatively planarly stationary. As an operator axially turns the bar 42 the threads of the bar 42 cooperate with the threads in the central aperture 40 in the middle section 18 to longitudinally move the bar 42 thereby moving the block 44 relative to the frame 12. In the embodiment shown, the movement of the block 44 is generally limited by contact with a cable against the upper curved portion 24 of the frame 12 or contact with the middle section 18 of the frame 12.

The two clamps 11 and 13, in this embodiment, are generally shown mounted in a first position relative to each other. The top section 16 of the second clamp 13 is fixedly, but adjustably mounted to the bottom section 20 of the first clamp 11. The top teeth 34 of the second clamp 13 are generally positioned in the bottom notches 52 of the first clamp 11 and a portion of the bottom teeth 50 of the first clamp 11 are cooperatively positioned in the top notches 32 of the second clamp 13.

In this embodiment, the two clamps are positioned in a first position with the top section marking 57 of the second clamp 13 aligned with the lower bottom section color markings 55 of the first clamp 11. In this first position, the two upper curved portions 24 of the clamps 11 and 13 are generally separated by a distance X of about 6¾ inches. However, any suitable distance can be provided. An operator, seeing the alignment between marking 57 and the lower markings 55 can automatically determine that the assembly 10 is in the first position and can either use the assembly 10 or adjust the two clamps 11 and 13 as will be described below.

In order to maintain the two clamps 11 and 13 at a specific position, in this figure the first position, a bolt or fastening member 66 (See FIG. 2b) is provided. The bolt 66 fixedly joins the two clamps 11 and 13, but is removable or can be loosened such that the two clamps 11 and 13 may be removed from each other or adjusted relative to each other. The bolt 66 passes through the central aperture 54 in the bottom section 20 of the first clamp 11 and screws into the threaded hole 46 (See FIG. 2b) of the middle section 18 of the second clamp 13. When tightened, the bolt 66 bears against the bottom section 20 of the first clamp 11 and against the threads in the hole 46 in the second clamp 13 thus locking the first and second clamps and 13 together in the first position an cooperating with the teeth 34 and 50 in preventing substantially all relative movement therebetween.

Referring now to FIG. 2b, the assembly 10 of FIG. 2a is shown in a second position having two cables B and C mounted therein. In this figure, the first clamp 11 is shown in a plain side view and the second clamp 13 is shown in a partial cross-sectional side view. In this embodiment, the second position comprises the top section 16 of the second clamp 13 being relatively closer to the top section 16 of the first clamp 11 such that the distance X in the second position is relatively shorter than the distance X in the first position shown in FIG. 2a. In a preferred embodiment the distance X in the second position is about 5½ inches. However, any suitable distance can be provided.

The two clamps 11 and 13 are mounted to each other in the second position substantially similar to the manner in which they are mounted in the first position. However, in the second position, the operator positions the top section marking 57 (not shown) of the second clamp 13 at the marking 59 on the bottom section 20 of the first clamp 11. By aligning the two markings 59 and 57 the operator automatically knows that the two clamps are positioned in the second position. The top teeth 34 of the second clamp 13 cooperatively meet with the bottom notches 52 of the first clamp 11 and a portion of the bottom teeth 50 of the first clamp 11 are cooperatively positioned in the top notches 32 of the second clamp 13. The bolt 66 fixedly joins the two clamps 11 and 13 as described below.

In order to change the positioning of the assembly 10 by adjusting the two clamps 11 and 13 relative to each other or separate the two clamps 11 and 13 the operator need only loosen or remove the bolt 66. If the bolt 66 is removed from the assembly 10 the two clamps 11 and 13 can easily be separated from each other and then be positioned or adjusted. The two clamps 11 and 13 can also be reversed such that the first clamp 11 is the lower clamp and the second clamp 13 is the upper clamp or if one is broken it can be replaced by another clamp or the two clamps 11 and 13 may merely be separated for cleaning or storage. If the bolt 66 is merely loosened, it is nonetheless possible to separate the two clamps 11 and 13 or otherwise adjust them. The bolt 66 and threaded hole 46 are sufficiently long to allow the bolt 66 to be loosened and the first clamp 11 separated from the second clamp 13 such that the upper teeth 34 of the second clamp 13 can pass over the lower teeth 50 of the first clamp 11. The second clamp can thus be slid up or down the central aperture 54 of the first clamp 11 to adjust the assembly 10. The bolt 66 can also merely slide along the aperture 54. The two clamps 11 and 13 can also be removed from each other by merely loosening the bolt 66 as described above and sliding the bolt 66 through the aperture 54 of the first clamp until it reaches a enlarged portion 68 of the aperture 54 which is sufficiently large enough to allow the entire bolt 66 to pass therethrough.

Although the present embodiment has been described with merely two positions, it is obvious that many additional positions can be provided. In addition, although color coded marking have been described, any suitable markings could be used to quickly position the two clamps at a desired position relative to each other. Other suitable positioning means could also be used such as irregular teeth and matching notches at specific positions along the clamps. In addition, suitable alternatives can be envisioned to replace a teeth/notches configuration. It should be remembered; however, that the teeth/notches configuration of the present invention allows not only quick and accurate positioning of the two clamps 11 and 13, but also provides a bearing surface between the clamps for holding the cables B and C without allowing movement between the two clamps.

Figure 2C:
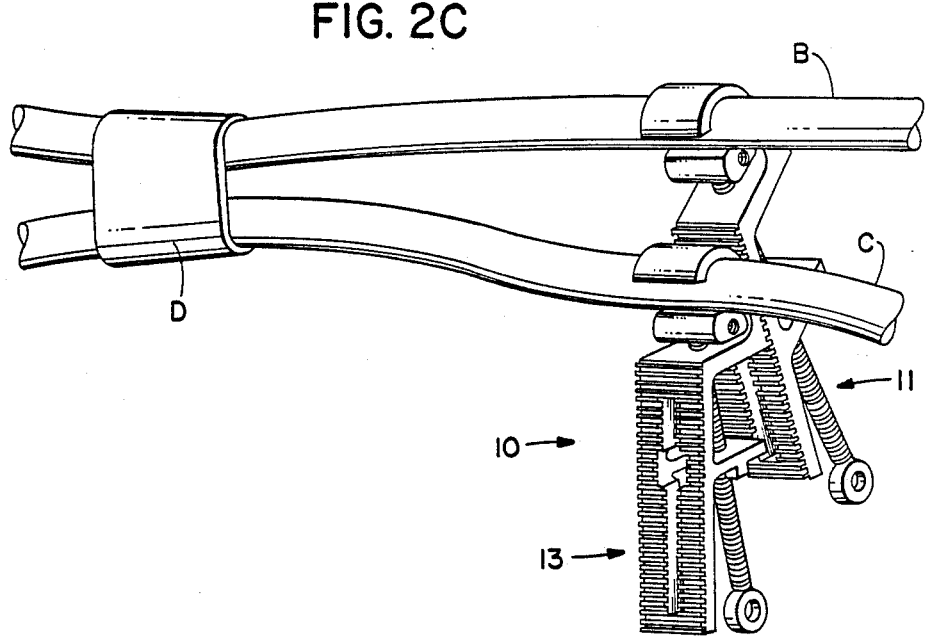
FIG. 2c is a perspective view of the assembly shown in FIG. 2b.

Referring also to FIG. 2C there is shown a perspective view of an assembly 10 having two cables B and C clamped therein. The operator can generally use the assembly 10 in the following manner. The operator takes the first clamp 11 and attaches the second clamp 13 if not already attached. He can adjust the two clamps 11 and 13 to a desired position. The operator, knowing the size of the main cable B and the tap cable C, knows the color coded size connector D to use and can adjust the two clamps 11 and 13 such that the proper color coded markings are aligned for that connector D. With the proper color coded markings aligned, the operator has set the distance X for the proper distance between the two cables to properly position the cables B and C for a relatively easily attachment of the connector D. The operator can then clamp the main cable B in the first clamp 11 and then clamp the tap cable C in the second clamp 13. With the two cables thus clamped, the operation can attach the connector D. Although the present invention has been described with the use of markings or indications to position the clamps relative to each other, the clamps do not require these indications and the operator may, in fact, ignore the indications to obtain a desired position.

Figure 3:
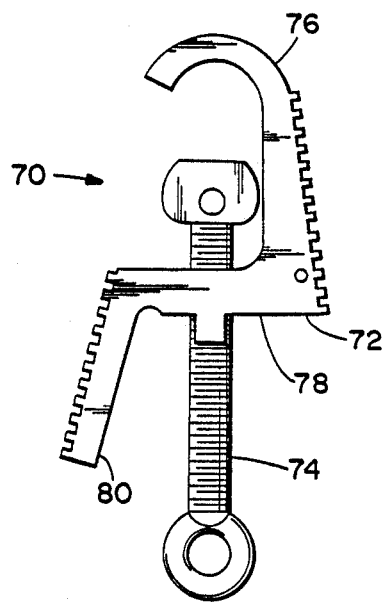
FIG. 3 is a side view of an alternative embodiment of the invention.

Referring now to FIG. 3, there is shown a side view of an alternative embodiment of the invention. In this embodiment, a modular clamp 70 is shown. The clamp 70 generally comprises a frame 72 and a movable anvil assembly 74. The anvil assembly 74 is substantially similar to the anvil assembly 14 described in the embodiment shown in FIG. 2a. The frame 72 generally comprises a top section 76, a middle section 78 and a bottom section 80. In this embodiment, unlike the embodiment of the clamps described in FIG. 2a, the frame 72 does not have a stabilizing section for the anvil assembly 74.

Figure 4:
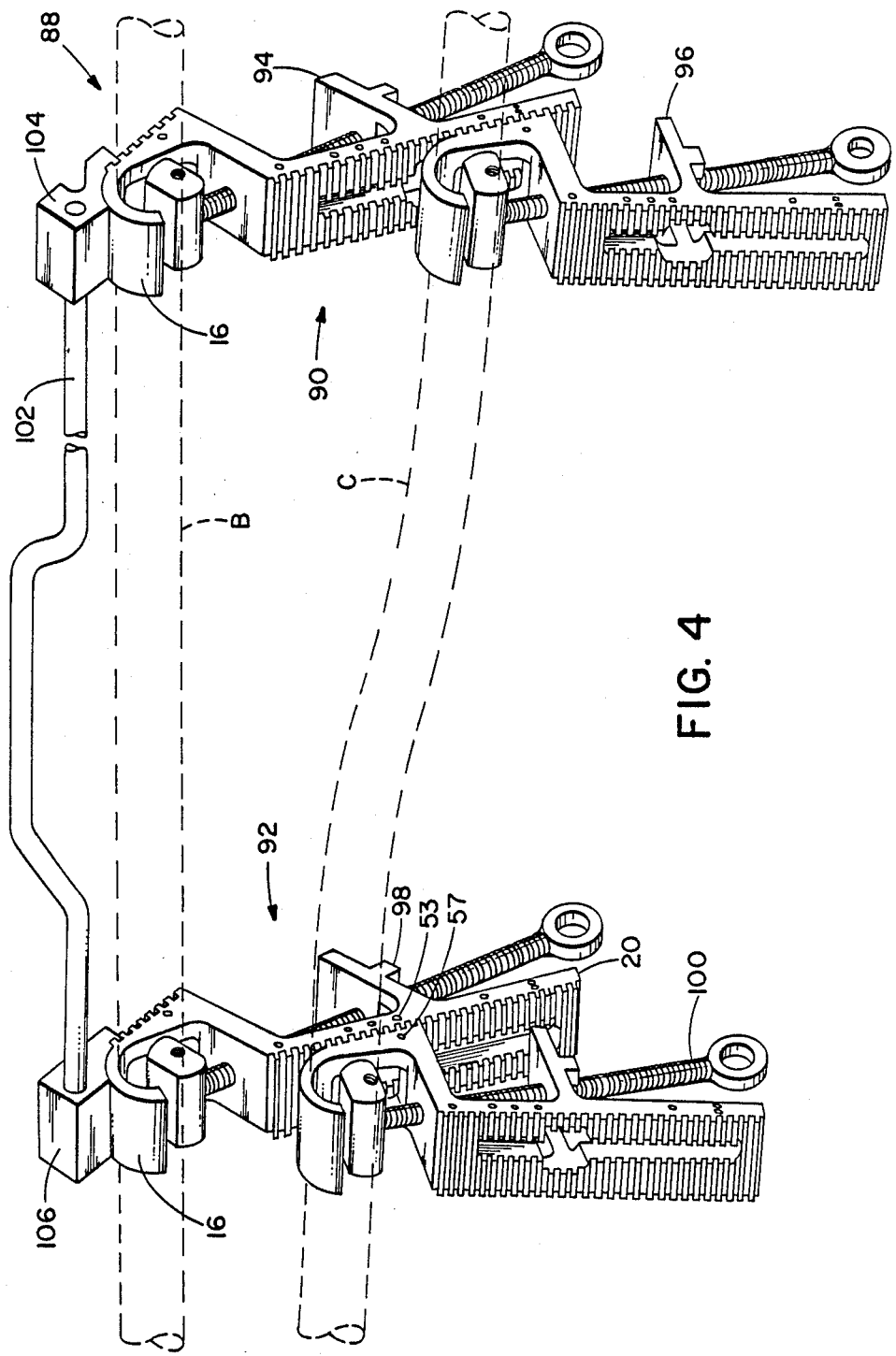
FIG. 4 is a perspective view of a system having two assemblies incorporating features of the invention.

Referring now to FIG. 4, there is shown a perspective view of a system 88 incorporating features of the invention. The system in this embodiment generally comprises two clamp assemblies; a first clamp assembly 90 having a first clamp 94 and a second clamp 96 and a second clamp assembly 92 having a third clamp 98 and a fourth clamp 100. The two assemblies 90 and 92 are substantially identical to the assembly 10 shown in FIG. 2a. In this embodiment, the two assemblies are being used to provide a more stable area in which a connector can be mounted to the two cables. In the embodiment shown, the connector can be connected to the cables at a position between the two assemblies 90 and 92.

As shown in this embodiment, the first assembly 90 is positioned at a first position relative to the cables B and C and the second assembly 92 is positioned at a second position relative to the cables. The first assembly 90, in this embodiment has the two clamps 94 and 96 adjusted to the first clamping assembly position as shown in FIG. 2a. The second assembly 92, in this embodiment, has the two clamps 98 and 100 adjusted to a third clamping assembly position. The third clamping assembly position is generally recognized by the marking 57 on the upper section 16 of fourth clamp 100 being positioned at one of the upper series of marking 53 on the third clamp 98 bottom section 20.

Located between and connected to the two assemblies 90 and 92 is a spacer bar 102. The spacer bar 102 is further provided to stabilize the work area between the two assemblies 90 and 92. The bar 102 is connected to the assemblies 90 and 92 by means of fixation/adjuster blocks 104 and 106. A first block 104 is mounted to the top section 16 of the first clamp 94 in the first assembly 90 and a second block 106 is mounted to the top section 16 of the third clamp 98 in the second assembly 92.

Figure 7:
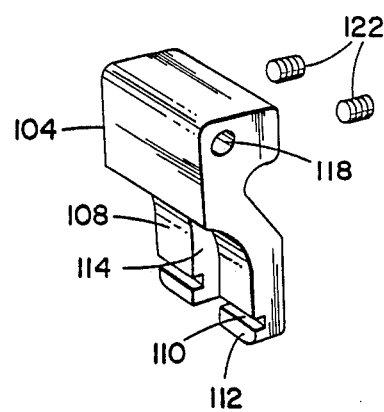
FIG. 7 is a perspective view of an assembly fixer/adjuster block.

Referring to FIG. 7, a perspective view of the fixation/adjuster block 104 is shown. The block 104 has an inner face 108 generally curved to cooperatively lie against a portion of the top section 16 of a clamp frame 12. A suitable groove 110 and tooth 112 are provided to cooperatively mate with the upper most tooth 34 and groove 32 in the top section 16 of the clamp frame. A suitable hole 114 is provided to allow a bolt (not shown) to pass through the block 104 and screw into the hole 36 at the top section 16 of the frame 12 (see FIG. 2b). The bolt (not shown) thereby fixes the block 104 to the first assembly 90. The second block 106 is virtually identical to the first block 104 and is mounted to the third clamp 98 in a similar manner.

The block 104 has a hole 118 which travels the width thereof and is generally sized to accommodate the spacer bar 102. Two additional holes (not shown) are provided in the block 104 which intersect the space bar hole 118. Two locking screws 122 are provided which when tightened into the two holes (not shown) ca lock the spacer bar 102 relative to the block 104 and first assembly 90. The second block 106 has similar features and can lock the spacer bar 102 relative to the second block 106 and second assembly 92.

Referring back to FIG. 4, the two assemblies 90 and 92 can be adjustably positioned relative to each other by merely tightening the locking screws 122 of the blocks 104 and 106 at different positions along the bar 102. The bar 102 can have any suitable length and is provided, in this embodiment, with an irregular profile to allow the operator to work in the work area between the two assemblies 90 and 92 without substantial interference from the bar 102. With the system 88 shown in FIG. 4, the operator can connect the first and second assemblies 90 and 92 to the main cable B with the spacer bar 102 cooperating to set a fixed predetermined distance between the assemblies. The tap cable C can then be clamped to the second and fourth clamps 96 and 100. Since the first and third clamps 94 an 98 are at the relatively same height and the second and fourth 96 and 100 clamps are at different positions in their assemblies 90 and 92, respectively, the main cable B and tap cable C will have a wedge shaped configuration or profile in the work area between the two assemblies 90 and 92. With the cables being shaped in a wedge profile, the operator can more easily attach a wedge shaped connector to the two cables. In alternative embodiments, the distance between the two assemblies 90 and 92 can be varied as well as the positions of the clamps in each assembly to vary the shape or slope of the cables. In addition, means other than the spacer bar 102 may be used to set the assemblies 90 and 92 at a specified distance from each other. The system 88 can also operate without the spacer bar 102 by merely positioning the two assemblies at their proper positions on the cables.

Referring now to FIG. 5, a side view of an alternative embodiment of the invention is shown. In this embodiment, a clamp 124 is sown separate from an assembly. The clamp 124 is generally intended to be used as the second lower clamp in an assembly, but may also be used as the first upper clamp. The clamp 124 has a frame 126 substantially identical to the frame 12 of the clamp embodiments 11 and 13 shown in FIG. 2a. However, the clamp 124 has a different movable anvil assembly 128 than the assemblies 14 shown in FIG. 2a. In this embodiment the anvil assembly 128 comprises a threaded bar 130 cooperatingly mounted in the frame 126 for controlled longitudinal movement therethrough and an anvil block 132 rotatably mounted thereon. The anvil block 132, in this embodiment, generally comprises a first clamping surface 134 and an extension 136 having a second clamping surface 138.

Figure 8:
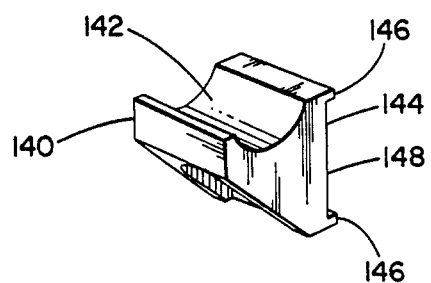
FIG. 8 is a perspective view of a clamp saddle.

In the embodiment shown, fixedly, but adjustably mounted to the bottom section 20 of the frame 126 is an adjustable saddle 140. Referring also to FIG. 8, a perspective view of the saddle 140 is shown. The saddle 140 is generally a unitary member having a cable contact surface 142 and a frame contact face 144. The frame contact face 144 generally comprises teeth 146 and a groove 148 for cooperating with the teeth and grooves on the bottom section 20 of the frame 126 for fixing the saddle 140 to frame 126. A bolt 150 is provided to cooperate with a threaded hole 152 in the saddle 140 and the aperture 54 in the frame 126 to hold the saddle to the frame. The bolt 150 passes through the central aperture 54 in the frame 126 and when tightened, bears against the frame 126 and the threads in the threaded hole 152 to retain the saddle 140 to the frame 126 in a fixed position. In order to adjust or remove the saddle 140 from the frame 126 the operator may do so, in a manner similar to the separation or adjustment described above with regard to the two clamps 11 and 13 shown in FIG. 2a, by simply loosening or removing the bolt 150.

With the saddle 140 in its desired position relative to the clamp 124, in this embodiment color coded markings 153 and 154 on the frame 126 and the saddle 140, respectively, are provided to aid in proper positioning, a cable C can be clamped between the cable contact surface 142 and the second clamping surface 138 of the extension 136. Thus, when used as the second lower clamp in a clamp assembly, the clamp 124 can allow two cables to be clamped at a greater distance relative to each other than in the configuration shown in FIG. 2a. The clamp 124 may also nonetheless clamp a cable between the first clamping surface 134 and the frame upper curved portion 24.

Referring now to FIG. 6, a side view of an alternative embodiment of the invention is shown. In this embodiment, a clamp 156 is shown having a frame 158, a first movable anvil assembly 160 and a second anvil assembly 166. The frame 158 is substantially identical to the frames 11 and 13 shown in FIG. 2a. The first anvil assembly 160 comprises a threaded bar 162 cooperatingly mounted in the frame 158 for controlled longitudinal movement therethrough and a first anvil block 164 rotatably mounted thereon. The second movable anvil assembly 166 is cooperatingly mounted in the first anvil block 164 for controlled longitudinal movement therethrough. The first anvil block 164, in this embodiment, generally comprises a first clamping surface 168 and an extension 170 having a threaded hole 172 therein.

The second anvil assembly 166 generally comprises a threaded bar 174 mounted in the hole 172 of the extension 170 for controlled longitudinal movement therethrough. Mounted on the bar 174 is a second anvil block 176. The bar 174 and hole 172 can be generally oriented parallel to the bottom section 20 of the frame 158, but may be angled relative thereto. With the clamp 156 thus assembled, a saddle 140 can be positioned on the bottom section 20 of the frame 158 at a lower position than that shown in FIG. 5. The first and second anvil assemblies 160 and 166 can be adjusted to hold a cable C between the saddle 140 and the second anvil block 176. Thus, the clamp 156 can be used as a lower second clamp in a clamp assembly such that two cables (not shown) can be clamped at a greater distance relative to each other than with the second clamp embodiment shown in FIG. 5. The clamp 156 may also nonetheless clamp a cable between the first clamping surface 168 and the frame upper curved portion 24. An alternative embodiment can also be used where three or more clamps 11 can be assembled into one clamp assembly for holding two or more cables.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A clamp for use in a multi-clamp assembly having a second clamp, the assembly being capable of individually clamping at least two cables, the clamp comprising:
   frame means having a top section, a middle section and a bottom section, said bottom section extending away from a clamping area along a substantially linear pathway;
   clamp interconnection means for modularly connecting said frame means to the second clamp, said interconnection means comprising means for adjustably attaching the second clamp to said bottom section at more than one location on said linear pathway of said bottom section; and
   means for engaging a cable in said clamping area proximate said top section, said means for engaging a cable including a movable anvil means having an anvil block and an adjustable bar, said bar being cooperatingly connected to said middle section of said frame means for adjustably moving said anvil block relative to a frame clamp surface means whereby the clamp is a modular clamp.

2. A clamp as in claim 1 wherein said clamp surface means comprises a relatively curved portion.

3. A clamp as in claim 1 wherein said clamp interconnection means comprises multiple parallel locking members.

4. A clamp as in claim 1 wherein said clamp interconnection means comprises a fastening means.

5. A clamp as in claim 1 wherein said clamp interconnection means comprises a first series of parallel locking members on said top section and a second series of parallel locking members on said bottom section wherein the second clamp can be connected to said frame at either said top section or said bottom section.

6. A clamp as in claim 5 wherein said first series of locking members can be connected to the second clamp and said second series of locking members can be connected to a movable saddle means.

7. A clamp as in claim 6 wherein said means for engaging a cable further comprises means for engaging a cable against said saddle means.

8. A clamp as in claim 7 wherein said means for engaging a cable against said saddle means comprises a movable anvil means.

9. A clamp as in claim 1 wherein said bottom section further comprises an anvil means stabilizing means.

10. A clamp as in claim 1 wherein said frame means further comprises means for engaging a connecting bar means for connecting a first clamp assembly to a second clamp assembly.

11. A clamp as in claim 1 further comprising markings on said frame means for accurately and precisely positioning the modular clamp relative to the second clamp at predetermined positions.

12. A clamp as in claim 1 further comprising means for preventing connection of the modular clamp with the second clamp at positions other than selected predetermined positions.

13. A clamp as in claim 1 wherein said adjustable bar is a threaded bar.

14. A clamp as in claim 11 wherein said markings are color coded.

* * * * *